(12) United States Patent
Zeng et al.

(10) Patent No.: US 10,745,037 B2
(45) Date of Patent: Aug. 18, 2020

(54) FULLY CONTINUOUS GROUND MEASUREMENT METHOD AND SYSTEM FOR WHEEL RAIL VERTICAL FORCE

(71) Applicants: CHINA ACADEMY OF RAILWAY SCIENCES, Beijing (CN); LOCOMOTIVE & CAR RESEARCH INSTITUTE OF CHINA ACADEMY OF RAILWAY SCIENCES, Beijing (CN); RAILWAY ENGINEERING RESEARCH INSTITUTE OF CHINA ACADEMY OF RAILWAY SCIENCES, Beijing (CN); BEIJING ZONGHENG ELECTRO-MECHANICAL DEVELOPMENT CO., Beijing (CN); CR TECHNOLOGICAL DEVELOPMENT CORPORATION, Beijing (CN)

(72) Inventors: Yuqing Zeng, Beijing (CN); Xuwei Li, Beijing (CN); Weidong Yu, Beijing (CN); Xuesong Chai, Beijing (CN)

(73) Assignees: China Academy of Railway Sciences, Beijing (CN); Locomotive & Car Research Institute of China Academy of Railway Sciences, Beijing (CN); Railway Engineering Research Institute of China Academy of Railway Sciences, Beijing (CN); Beijing Zongheng Electro-Mechanical Development Co., Beijing (CN); CR Technological Development Corporation, Beijing (CN)

(*) Notice: Subject to any disclaimer, the term of this patent is extended or adjusted under 35 U.S.C. 154(b) by 421 days.

(21) Appl. No.: 15/568,889

(22) PCT Filed: Apr. 28, 2015

(86) PCT No.: PCT/CN2015/077653
§ 371 (c)(1),
(2) Date: Oct. 24, 2017

(87) PCT Pub. No.: WO2016/172844
PCT Pub. Date: Nov. 3, 2016

(65) Prior Publication Data
US 2018/0099683 A1 Apr. 12, 2018

(51) Int. Cl.
*B61L 23/04* (2006.01)
*G01L 5/16* (2020.01)
(Continued)

(52) U.S. Cl.
CPC ............. *B61L 23/04* (2013.01); *B61L 23/042* (2013.01); *B61L 27/0088* (2013.01); *G01L 5/16* (2013.01);
(Continued)

(58) Field of Classification Search
CPC ........ B61L 23/00; B61L 23/04; B61L 23/042; B61L 27/0088; G01L 5/16; G01M 5/00; G01M 5/0025; G01M 5/0041
See application file for complete search history.

(56) References Cited

U.S. PATENT DOCUMENTS 3,718,040 A * 2/1973 Freeman .................. G01L 5/161
73/146
5,492,002 A * 2/1996 Higgins ................ G01M 17/10
73/1.14
(Continued)

FOREIGN PATENT DOCUMENTS

| CN | 104359603 A * | 2/2015 | |
|----|---------------|--------|---|
| DE | 10209872 A1 | 9/2003 | |
| WO | WO-2004068083 A1 * | 8/2004 | .......... G01G 19/047 |

OTHER PUBLICATIONS

Gassmann, Machine Translation of DE10209872, Sep. 18, 2003 [retrieved on Feb. 4, 2020]. Retrieved from the Internet: <URL: https://worldwide.espacenet.com/patent/search/family/027762742/publication/DE10209872A1?q=DE10209872> (Year: 2003).*

(Continued)

*Primary Examiner* — Alexander Satanovsky
*Assistant Examiner* — Liam R Casey
(74) *Attorney, Agent, or Firm* — FisherBroyles, LLP; Susan M. Oiler

(57) ABSTRACT

A continuous measurement method for a wheel/rail vertical force includes: continuously arranging classic wheel/rail
(Continued)

vertical force unit measurement areas in a form of "shear force+support force" on rails, where adjacent unit measurement areas share an end shear force measurement, and each two adjacent unit measurement areas form a unique compound measurement area; obtaining the wheel/rail vertical force when a wheelset passes the unit measurement areas other than the transition area of shear force measurement by using the classic unit measurement areas; obtaining the wheel/rail vertical force when the wheelset passes the transition area of the shared shear force measurement by using the unique compound measurement area; and combining all wheel/rail vertical forces on the unit measurement areas and the compound measurement areas to obtain a long distance fully continuous wheel/rail vertical force of the wheelset.

10 Claims, 12 Drawing Sheets

(51) Int. Cl.
G01G 19/04 (2006.01)
B61L 27/00 (2006.01)
G01M 5/00 (2006.01)
(52) U.S. Cl.
CPC ........ *G01M 5/0025* (2013.01); *G01M 5/0041* (2013.01); *G01G 19/047* (2013.01)

(56) References Cited

U.S. PATENT DOCUMENTS

2002/0111724 A1* 8/2002 Dembosky ............. B61F 5/383
   701/19
2011/0313686 A1* 12/2011 Saracho Rotaeche ... B61K 9/08
   702/42
2017/0363518 A1* 12/2017 Ehmke .................... B61K 9/12

OTHER PUBLICATIONS

Johansson et al., "Out-of-round railway wheels—wheel-rail contact forces and track response derived from field tests and numerical simulations," 2003, Proc. Instn Mech. Engrs vol. 217 Part F: J. Rail and Rapid Transit (Year: 2003).*
Chen et al., Machine Translation of CN104359603, Feb. 18, 2015 [retrieved on Jun. 9, 2020]. Retrieved from the Internet: <URL: https://worldwide.espacenet.com/patent/search/family/052526886/publication/CN104359603A?q=CN104359603>. (Year: 2015).*
AU, First Office Action; Australian Application No. 2015392675 (dated Oct. 25, 2018).
WO, Written Opinion; International Application No. PCT/CN2015/077653 (dated Oct. 25, 2018).
International Search Report dated Feb. 3, 2016 in PCT/CN2015/077653 (with English translation) (8 pages).

* cited by examiner

FULLY CONTINUOUS GROUND MEASUREMENT METHOD AND SYSTEM FOR WHEEL RAIL VERTICAL FORCE

CROSS-REFERENCE TO RELATED APPLICATIONS

The present invention is filed under 35 U.S.C. § 371 as the U.S. national phase of International Patent Application No. PCT/CN2015/077653, filed Apr. 28, 2015, which designated the United States and which is hereby incorporated in its entirety including all tables, figures, and claims.

TECHNICAL FIELD

The present invention relates to the field of rail transportation and, in particular, to a fully continuous ground measurement method and system for a wheel/rail vertical force.

BACKGROUND OF THE INVENTION

Wheel/Rail force ground measurements of rail vehicles are very important to safety evaluation of rail vehicles. Since the strain of steel rails above sleepers is greatly affected by the support state of the sleepers, the wheel/rail vertical force applied to the rail located above the sleepers cannot be measured stably. The existing wheel/rail vertical force ground measurement is usually implemented by a discontinuous mid-span shear force method. For example, the current railway industry standard "Ground Measurement Method for Wheel/Rail Horizontal Force and Vertical Force" (TB/T 2489-94) in China provides that a wheel/rail vertical force is measured using a combination of two shear force measurement points with a spacing of 220 mm in the same mid-span of rail. On a conventional line, the mid-span shear force method generally can merely obtain a wheel/rail vertical force within a distance not greater than 10 cm, and the effective measurement scale is about 0.1 m.

The Chinese patent No. ZL 92228559.4 and entitled "Combined Device for Dynamic Measurement of Vertical Force" (abbreviated as "the 559 patent" hereinafter) employs two shear force sensors arranged in different mid-spans of rail and one or more weighing sensors which located between the two shear force sensors to form a wheel/rail vertical force measurement platform, and combines the outputs of the shear force sensors and of the weighing sensors of the measurement platform to obtain a wheel/rail vertical force applied to the entire measurement platform. However, when this existing 'shear force+support force' method is applied to the measurement of a wheel/rail vertical force, the length of a single platform (a unit measurement area) is limited by the wheel base of the rail vehicle, and there is one ineffective shear force measurement area whose length is close to the steel rail height, i.e., a shear force measurement transition area. Thus, the actual effective measurement scale is about 1-2 m. When "the 559 patent" is applied in the industry to perform a long-distance measurement, a plurality of continuously arranged unit measurement areas are employed, and adjacent unit measurement areas share an end shear force sensor to obtain a quasi-continuous wheel/rail vertical force. This requires a longer nominal measurement length to realize full coverage measurement to the circumference of a wheelset, and a spatial time sequence cannot be ensured for the circumferential geometry of the wheelset. Thus, the safety monitoring requirements of passenger trains and high-speed trains cannot be well satisfied.

One technically feasible long distance continuous measurement method for a wheel/rail vertical force is to continuously arrange a plurality of 'shear force+support force' unit measurement areas so that the effective measurement ranges of adjacent unit measurement areas can mutually cover each other. At this moment, the end shear force sensors of adjacent unit measurement areas cannot be shared. However, this method is high in cost, and the system reliability is reduced under equivalent conditions, thus being difficult to promote and apply.

The Chinese patent No. ZL 2009 1 0086149.5 and entitled "Continuous Measurement Method and Device for Wheel/Rail Vertical Force based on Steel Rail Strain" employs different strain combinations of steel rails, realizing long-distance continuous measurement of the wheel/rail vertical force. Although the implementation cost of this method is not high, the maintenance is inconvenient, thus currently being difficult to be widely applied in engineering.

SUMMARY OF THE INVENTION

In view of the above technical problems, the present application proposes a continuous measurement method for a wheel/rail vertical force, in a first unit measurement area, a second unit measurement area and a first-second compound measurement area formed by the first and second unit measurement areas, wherein the first unit measurement area including a first shear force measurement point, a second shear force measurement point common to the first and second unit measurement areas and one or more sleeper vertical support force measurement points between the first and second shear force measurement points, wherein the second unit measurement area further including a third shear force measurement point and one or more sleeper vertical support force measurement points between the second and third shear force measurement points, and wherein the first-second compound measurement area not employing the second shear force measurement point. The method comprises: using measurement results of the first and second shear force measurement points and of the sleeper vertical support force measurement points between the first and second shear force measurement points to obtain a wheel/rail vertical force applied to the first unit measurement area; using measurement results of the second and third shear force measurement points and of the sleeper vertical support force measurement points between the second and third shear force measurement points to obtain a wheel/rail vertical force applied to the second unit measurement area; obtaining a wheel/rail vertical force applied to the first-second compound measurement area; and combining wheel/rail vertical forces applied by a wheelset to the first and second unit measurement areas and to the first-second compound measurement area to obtain a continuous wheel/rail vertical force of the wheelset.

In the method mentioned above, the wheel/rail vertical force applied to the first-second compound measurement area is obtained by using measurement results of the first and third shear force measurement points and of sleeper vertical support force measurement points between the first and third shear force measurement points or by adding the wheel/rail vertical forces applied to the first and second unit measurement areas.

In the one or more methods mentioned above, when the wheelset is on a second shear force measurement transition area corresponding to the second shear force measurement point, a previous wheelset and a following wheelset of the current wheelset are located outside the first-second compound measurement area and also outside a third shear force measurement transition area corresponding to the third shear force measurement point and a first shear force measurement transition area corresponding to the first shear force measurement point.

In the one or more methods mentioned above, a wheel/rail vertical force applied by the wheelset to the first unit measurement area corresponds to a wheel/rail vertical force applied to the first unit measurement area during a period of time which starts at the moment when the wheelset rolls away from the first shear force measurement transition area and ends at the moment when the wheelset rolls into the second shear force measurement transition area; a wheel/rail vertical force applied by the wheelset to the second unit measurement area corresponds to a wheel/rail vertical force applied to the second unit measurement area during a period of time which starts at the moment when the wheelset rolls away from the second shear force measurement transition area and ends at the moment when the wheelset rolls into the third shear force measurement transition area; and a wheel/rail vertical force applied by the wheelset to the first-second compound measurement area corresponds to a wheel/rail vertical force applied to the first-second compound measurement area during a period of time which starts at the larger moment between the moment when the wheelset rolls away from the first shear force measurement transition area and the moment when a previous wheelset rolls away from the third shear force measurement transition area and ends at the smaller moment between the moment when the wheelset rolls into the third shear force measurement transition area and the moment when a following wheelset rolls into the first shear force measurement transition area.

In the one or more methods mentioned above, the wheel/rail vertical forces applied by the wheelset to the first and second unit measurement areas and to the first-second compound measurement area are combined in a manner of sequential splicing to generate the continuous wheel/rail vertical force, wherein periods of time in which the wheel/rail vertical forces do not overlap being spliced directly, and periods of time in which the wheel/rail vertical forces overlap being selected randomly or averaged and then spliced.

In the one or more methods mentioned above, the shear force measurement points are on a mid-span of a steel rail, and the moments when the wheelset rolls into and away from the shear force measurement transition areas are estimated according to positive and negative peak time of a corresponding shear force signal.

According to another aspect of the present invention, a fully continuous ground measurement system for a wheel/rail vertical force is proposed, comprising: a plurality of shear force measurement devices and support force measurement devices arranged on a steel rail spaced at intervals, wherein two adjacent shear force measurement devices and the support force measurement devices underneath form a unit measurement area; and a central control unit configured to connect to the shear force measurement devices and the support force measurement devices in a wired or wireless manner, wherein the central control unit, according to one or more of the above methods, obtains a continuous wheel/rail vertical force when a wheelset passes the fully continuous ground measurement system for a wheel/rail vertical force.

In the system mentioned above, the support force measurement device is arranged on each sleeper below the steel rail of the unit measurement area.

In the one or more systems mentioned above, the arrangement of a plurality of mid-span shear force measurement devices satisfies the following condition: the distance between any two-adjacent shear force measurement devices is smaller than the difference between the minimum wheel base of a wheelset to be measured and the length of a shear force measurement transition area.

In the one or more systems mentioned above, the length of a shear force measurement transition area is estimated according to a rail height.

BRIEF DESCRIPTION OF THE DRAWINGS

Hereinafter, preferred embodiments of the present invention will be further described in detail in combination with the accompanying drawings, in which.

DETAILED DESCRIPTION OF THE EMBODIMENTS

In order to make the objects, technical solutions and advantages of the present invention clearer, hereinafter, the technical solutions in the embodiments of the present invention will be described clearly and completely in combination with the drawings in the embodiments of the present invention. Obviously, the described embodiments are some embodiments of the present invention rather than all embodiments. Based on the embodiments of the present invention, all other embodiments obtained by those skilled in the art without any inventive efforts all belong to the protection scope of the present invention.

In some embodiments of the present invention, under the premise of not adding hardware configuration for the existing 'shear force+support force' quasi-continuous method and not reducing system reliability, the problem in the existing quasi-continuous method that 'a wheel/rail vertical force in a shear force measurement transition area cannot be measured' can be solved by adding simply constraint conditions and constructing a compound measurement area, realizing a long-distance fully continuous ground measurement for a wheel/rail vertical force.

Figure 1:
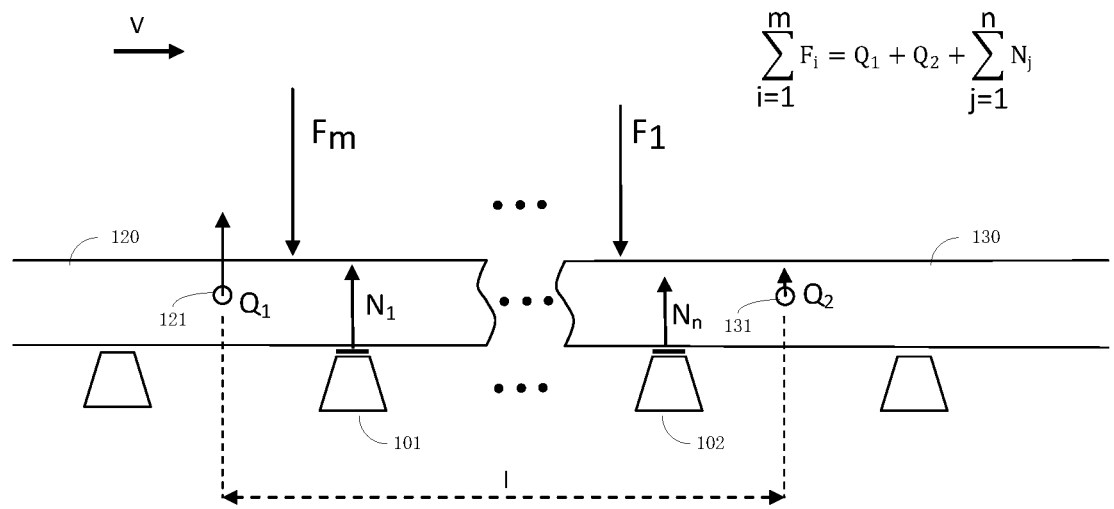
FIG. 1 is a schematic diagram of measuring a wheel/rail vertical force in a manner of 'shear forcing+support force'.

FIG. 1 is a schematic diagram of measuring a wheel/rail vertical force in a manner of shear force+support force. As shown in FIG. 1, steel rails 120-130 are provided underneath with a plurality of sleepers, including sleepers 101 and 102. The steel rails 120-130 are provided with steel rail mid-span shear force sensors 121 and 131. The sleepers under the steel rails between the shear force sensors 121 and 131 are provided with sleeper support force sensors, an arrow V representing the travel direction of the vehicle. The two shear force sensors 121 and 131 and the sleeper support force sensors underneath constitute a wheel/rail vertical force measurement area. The nominal measurement range of this measurement area is characterized by the shear force sensors 121 and 131.

The following can be obtained easily according to force balance conditions:

$$\Sigma_{i=1}^{m} F_i = Q_1 + Q_2 + \Sigma_{j=1}^{n} N_j \quad (1)$$

where $Q_1$ and $Q_2$ are vertical forces applied by a steel rail outside a wheel/rail force unit measurement area to a rail inside the area, being positive upwards; $F_i$ is a wheel/rail vertical force applied to the unit measurement area (the number thereof equals to the number of wheelsets above the unit measurement area and may be plural), being positive downwards; and $N_j$ is a steel rail support vertical force applied to the unit measurement area, being positive upwards. $Q_1$ and $Q_2$ are measured by the shear force sensors or by adhering a strain gauge. $N_j$ can be measured by a weighing sensor. It should be noted that the positive and negative signs when performing calculations using formula (1) shall be consistent with the above definitions. Otherwise, adjustments should be performed on positive and negative signs.

If a spacing l (represented with letter l) between two steel rail mid-span shear forces $Q_1$ and $Q_2$ is relatively short such that at most one wheel is located in the measurement area each time, then a continuous vertical force when each wheelset passes the measurement area can be obtained.

Figure 2:
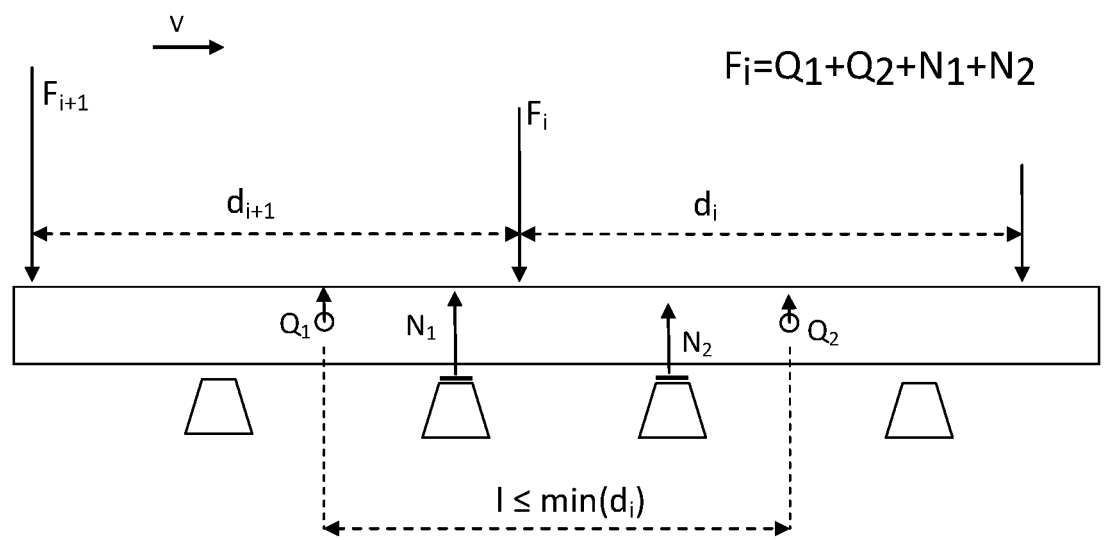
FIG. 2 is a schematic diagram of a single wheel (unit) wheel/rail vertical force continuous measurement area.

FIG. 2 is a schematic diagram of a single wheel/rail vertical force continuous measurement area (hereinafter referred to as unit wheel/rail vertical force continuous measurement area collectively, abbreviated as unit measurement area). As shown in FIG. 2, the condition corresponding to the unit wheel/rail vertical force continuous measurement area is:

$$l \leq \min(d_i) \quad (2),$$

where l is the length of the unit measurement area represented by the shear force spacing; and $d_i$ is the spacing between each wheelset.

From the condition expressed in formula (2): the length of the unit measurement area shall be smaller than the minimum wheel base, such that the length of the unit measurement area is limited when the wheel/rail vertical force is measured using the 'shear force+support force' method and the effective measurement scale order is meter (m).

In order to realize an independent measurement of each inter-wheel-rail vertical force and control costs as well as improve reliability, the spacing between two shear force sensors should be as large as possible under the premise of being not greater than the minimum wheelset spacing. For example, the Truck Performance Detection System (TPDS) widely used in China employs a special sleeper spacing such that the nominal spacing between the shear sensors thereof achieves 1.6 m, slightly smaller than the wheel base 1.75 m of a common truck.

Since the length of the unit wheel/rail vertical force continuous measurement area is limited, in order to realize a long-distance measurement of each inter-wheel-rail vertical force, usually a plurality of unit measurement areas arranged continuously are employed and adjacent unit measurement areas share an end shear force sensor. For example, the TPDS system employs three 1.6 m unit measurement areas to form one 4.8 m nominal measurement area.

The existing 'shear force+support force' method improves the effective measurement scale of the unit wheel/rail vertical force continuous measurement area to an order of m from 0.1 m in the common mid-span shear force method, where the application effects in industry are obvious. For example, since the large-scale application of the TPDS system, the tread damage alarm ratio of domestic railway trucks in China is reduced by more than 80%, while the number of large component cracks and damages of the trucks is reduced by about 95%.

However, since the prior art is based on a pure shear force state hypothesis when measuring a steel rail shear force, there is a shear force measurement transition area, the length of which is similar to the height of the steel rail. An output of the shear force measurement device (shear force sensor, strain gauge or the like) in the transition area cannot really reflect the magnitude of a shear force between the right and the left steel rail. As such, when performing a long-distance wheel/rail vertical force measurement using the method disclosed in "559 patent", what is actually obtained is a quasi-continuous wheel/rail vertical force. The data that there is about one rail height between two adjacent unit measurement areas is inaccurate.

Figure 3:
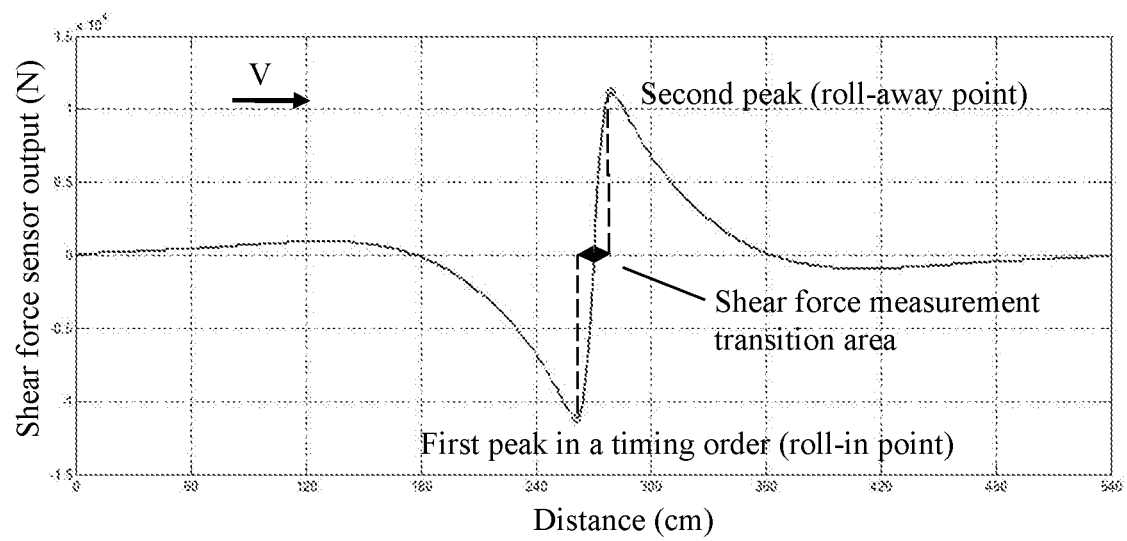
FIG. 3 is a simulation diagram of an output signal of a mid-span shear force measurement point.

FIG. 3 simulates an output of a steel rail mid-span shear force measurement point, wherein sleepers are located at 0, 60, 120, ... 540 cm on the horizontal axis, the sleeper spacing is 60 cm, the steel rail type is 60 kg/m (the rail height is 17.6 cm), and the shear force measurement point is located at 270 cm, i.e., right middle between 240 cm and 300 cm. When a wheelset with a constant weight rolls on this rail segment from left to right, the shear force sensor outputs a vertical force applied by the left rail to the right rail (being positive upwards). Generally, when the shear force measurement point is located at one area between two sleepers, the output result is not affected by the support state of the sleepers and has positive and negative dual-peak features as shown in FIG. 3. In the expressions of the present invention, this area specifically refers to a mid-span shear force measurement area. The steel rail mid-span shear force measurement area can be estimated simply with 'the minimum spacing between the front and rear sleepers is greater than ½ rail height' in terms of engineering. Obviously, this area includes the position in the right middle of two sleepers.

Figure 4:
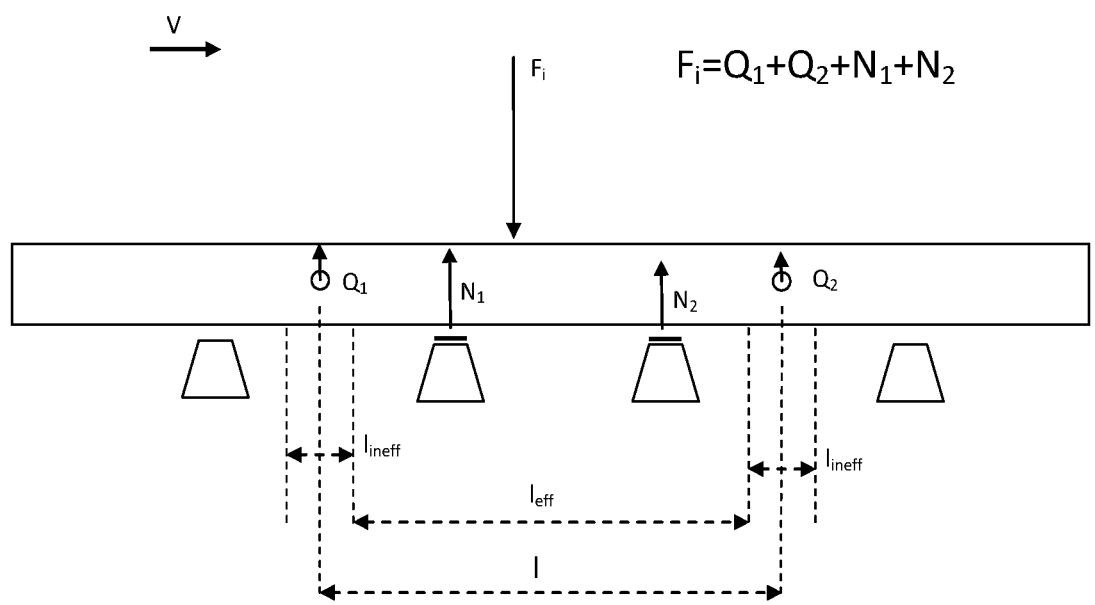
FIG. 4 is a schematic diagram of an effective measurement area of the unit wheel/rail vertical force continuous measurement area in FIG. 2.

In FIG. 3, a first peak (a negative peak in the figure) time arranged in a time sequence may be used to estimate the moment (position) when a wheelset rolls into a shear force measurement transition area; and a second peak (a positive peak in the figure) time may be used to estimate the moment when the wheelset rolls away from the shear force measurement transition area. In the shear force measurement transition area, since the difference from the pure shear force hypothesis is relatively large, the shear force measurement result is inaccurate, which can be deemed as ineffective. Accordingly, FIG. 4 illustrates an effective measurement area of the unit wheel/rail vertical force continuous measurement area shown in FIG. 2. In FIG. 4, $l_{eff}$ represents an effective measurement area, and $l_{ineff}$ represents an ineffective measurement area, i.e., a shear force measurement transition area.

The shear force measurement transition area limits further expansion of wheel/rail interaction monitoring, especially medium and high-speed passenger trains monitoring. For example, the existing truck TPDS in China has to use standard sleepers (0.6 m) in order to satisfy the automatic operation demand of large rail machines. Accordingly, the corresponding length of the unit measurement area will be reduced to 1.2 m from the original 1.6 m, and the proportion of the non-continuous measurement area to the nominal length shall raise to 15% from the original 11%. Thus, a longer total nominal length and more investments are needed to realize the same full coverage to wheelset tread faults as the existing TPDS. As another example, if polygonal wheelset faults which are frequent for high-speed trains and passenger trains are to be analyzed accurately, it requires to ensure the spatial time sequence of the wheelset circumferential geometry and also ensure that the proportion of the non-continuous area shall be as small as possible. To satisfy hunting monitoring of passenger trains and high-speed trains also requires longer continuous measurement areas.

The above problems can be solved by "overcoming the influence of the shear force measurement transition area and realizing a fully continuous ground measurement to a wheel/rail vertical force" according to an embodiment of the present invention. Thus, the effective implementation of the fully continuous ground measurement of the wheel/rail vertical force in an embodiment of the present invention has important engineering significance.

Figure 5:
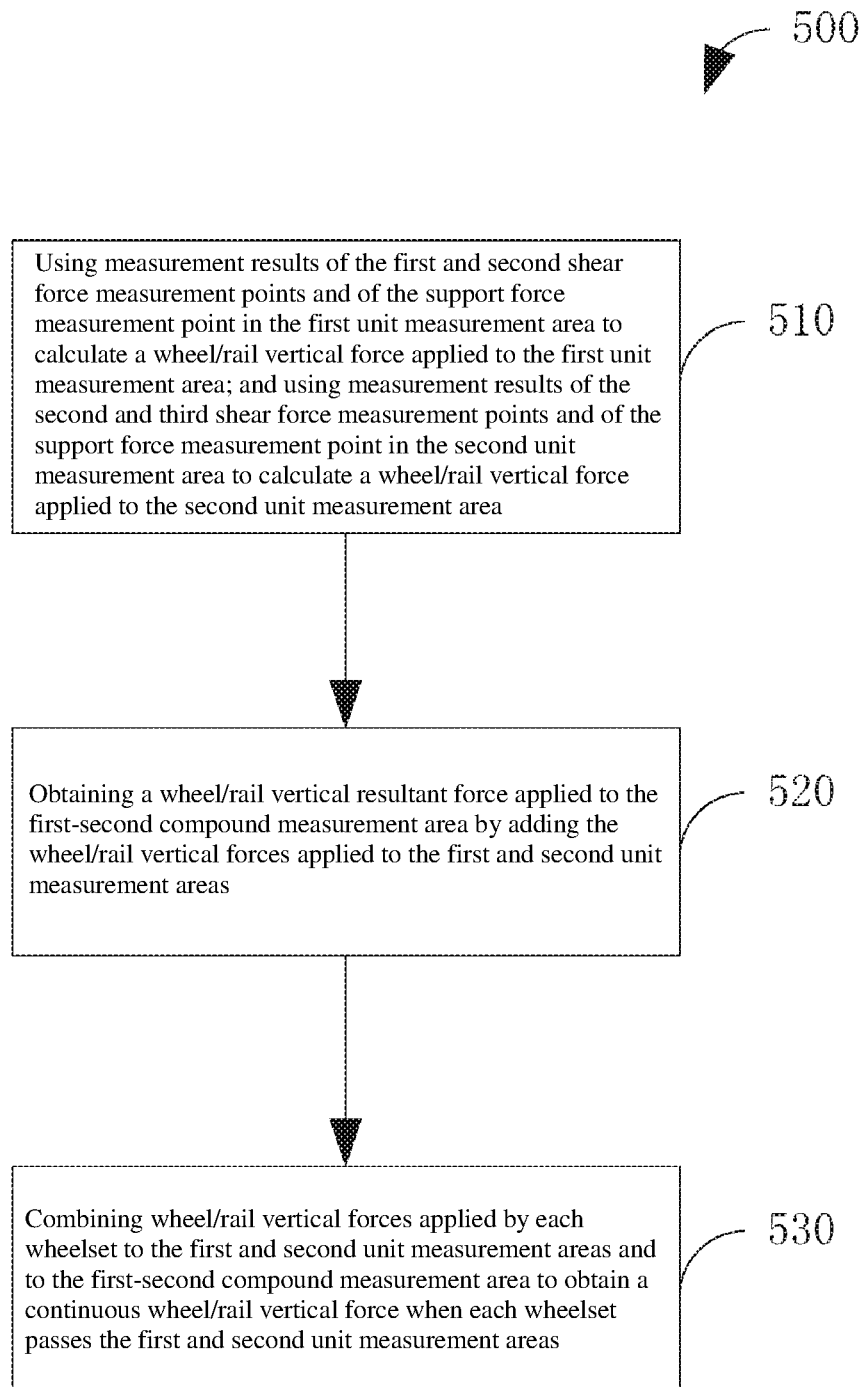
FIG. 5 is a flowchart of a measurement method for a wheel/rail vertical force according to an embodiment of the present invention.

FIG. 5 is a flowchart of a fully continuous ground measurement method for a wheel/rail vertical force according to an embodiment of the present invention. The definitions are as follows. In continuous first and second unit measurement areas and a first-second compound measurement area formed by the first and second unit measurement areas, the first unit measurement area includes a first shear force measurement point, a second shear force measurement point common to the first and second unit measurement areas, and one or more sleeper vertical support force measurement points between the first and second shear force measurement points; the second unit measurement area further includes a third shear force measurement point, and one or more sleeper vertical support force measurement points between the second and third shear force measurement points; the first-second compound measurement area is formed by the first and second unit measurement areas with the common second shear force measurement point removed; and the second shear force measurement point is arranged such that when any wheelset is located in the second shear force measurement transition area, a previous wheelset and a following wheelset of this wheelset are located outside the first-second compound measurement area and also outside the measurement transition areas of the third shear force measurement point and the first shear force measurement point.

As shown in FIG. 5, the measurement method 500 in the present invention includes the following steps. In step 510, according to the above 'shear force+support force' method, the measurement results of the first and second shear force measurement points and of the support force measurement points in the first unit measurement area are used to calculate a wheel/rail vertical force applied to the first unit measurement area; and the measurement results of the second and third shear force measurement points and of the support force measurement points in the second unit measure area are used to calculate a wheel/rail vertical force applied to the second unit measurement area.

In step 520, a wheel/rail vertical resultant force applied to the first-second compound measurement area is obtained by adding the wheel/rail vertical forces applied to the first and second unit measurement areas.

Since the shear force applied by the outer rail (right rail) to the inner rail (left rail) at the second shear force measurement point when calculating the wheel/rail vertical force applied to the first unit measurement area and the shear force applied by the outer rail (left rail) to the inner rail (right rail) at the second shear force measurement point when calculating the wheel/rail vertical force applied to the second unit measurement area have a relationship of an acting force and a counter force, the sum thereof is zero. As such, for step 520, the common shear force measurement point is neglected for two adjacent unit wheel/rail vertical force continuous measurement areas. A $1^{st}$ shear force measurement point (the first shear force measurement point) of a previous unit measurement area (the first unit measurement area) and a $2^{nd}$ shear force measurement point (the third shear force measurement point) of a following unit measurement area (the second unit measurement area) and all sleeper support force measurement points therebetween form a compound measurement area (the first-second compound measurement area). The wheel/rail vertical force applied to the first-second compound measurement area is obtained by using the 'shear force+support force' method.

Being different from step 510, the wheel/rail vertical force applied to the first-second compound measurement area in step 520 may be a resultant force of the wheel/rail vertical forces of a plurality of wheelsets at a certain moment, and the wheel/rail vertical forces applied to the first and second unit measurement areas in step 510 at most corresponds to the wheel/rail vertical force of one wheelset. The construction of the compound measurement area is a breakthrough to the implementation of a long-distance ground continuous measurement of a wheel/rail vertical force using the conventional 'shear force+support force' method in terms of concept and thinking.

Since the first, second and third shear force measurement points are arranged such that when any wheelset is on the second shear force measurement transition area, a previous wheelset and a following wheelset of this wheelset are located outside the first-second compound measurement area and outside the third and first measurement transition areas. This condition achieves that: 1) step 510 may obtain a continuous wheel/rail vertical force when any wheelset passes the first and second unit measurement areas except the first, second and third shear force measurement transition areas; and 2) step 520 may obtain a wheel/rail vertical resultant force applied to the first-second compound measurement area when any wheelset passes the second shear force measurement transition area, which is an accurate value of the wheel/rail vertical force of this wheelset at this moment, thus overcoming the effect of the common second shear force measurement transition area effectively.

In step 530, the wheel/rail vertical forces applied by each wheelset to the first and second unit measurement areas and to the first-second compound measurement area are combined to obtain a continuous wheel/rail vertical force when the wheelset passes the first and second unit measurement areas.

Figure 6:
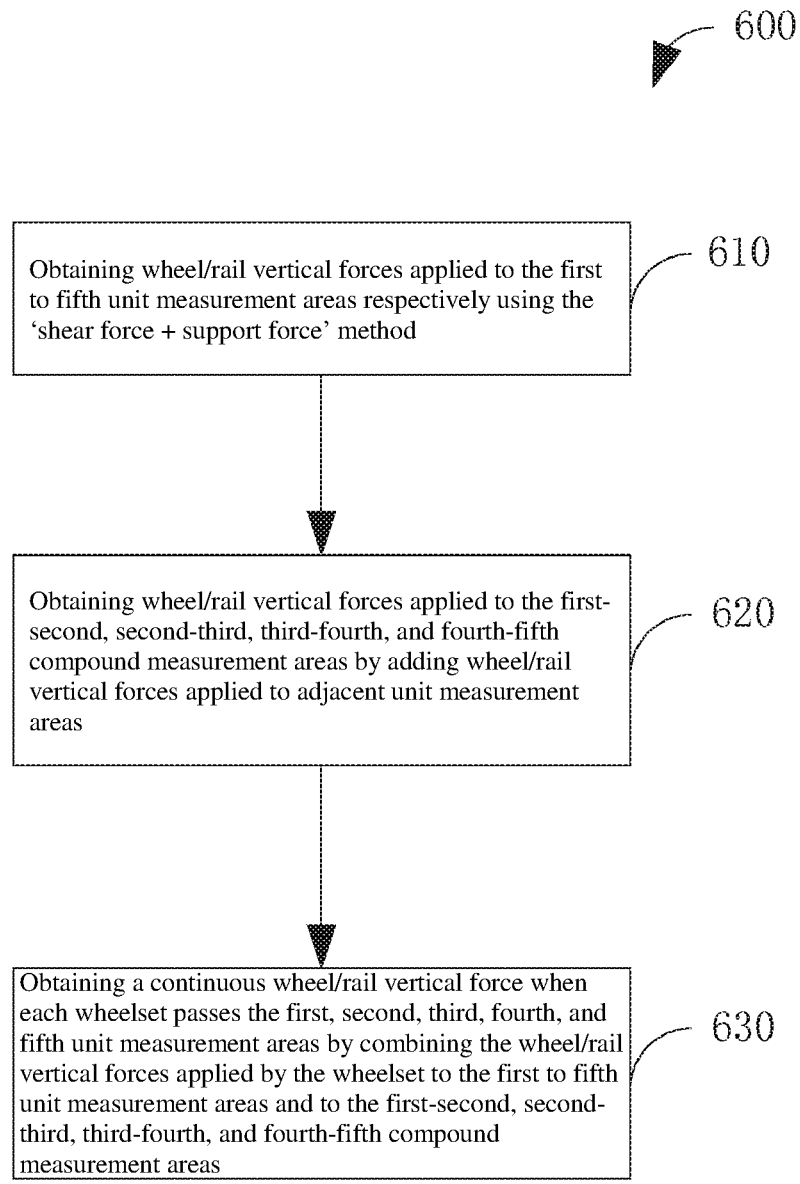
FIG. 6 is a flowchart of a measurement method for a wheel/rail vertical force according to another embodiment of the present invention.

FIG. 6 is a flowchart of a fully continuous ground measurement of a wheel/rail vertical force according to another embodiment of the present invention. The embodiment shown in FIG. 6 is an expansion to FIG. 5 to illustrate that the method in FIG. 5 may be applied to long-distance fully continuous measurement of a wheel/rail vertical force. The same features as those in the embodiment in FIG. 5 will not be described here.

The embodiment in FIG. 6 includes five unit measurement areas arranged in order: the first to fifth unit measurement areas which respectively include a first and a second shear force measurement points, a second and a third shear force measurement points, a third and a fourth shear force measurement points, a fourth and a fifth shear force measurement points and a fifth and a sixth shear force measurement points as well as sleeper support force measurement points underneath a corresponding steel rail.

The compound measurement areas constructed by all adjacent unit measurement areas are used to overcome the effect of corresponding common shear force measurement point measurement transition areas. For example, a second-third compound measurement area constructed by the second and third unit measurement areas is used to overcome the effect of the third shear force measurement transition area, and so on.

The arrangement of the I-th shear force measurement point satisfies that when any wheelset is on the I-th shear force measurement transition area, a previous wheelset and a following wheelset of this wheelset are located outside the ((I−1)−I)-th compound measurement area and outside the (I+1)-th and (I−1)-th shear force measurement transition areas, where I is 2-5. For example, when I is 3, the arrangement of the third shear force measurement point satisfies that when any wheelset is on the third shear force measurement transition area, a previous wheelset and a following wheelset of this wheelset are located outside the second-third compound measurement area and outside the fourth and second shear force measurement transition areas.

As shown in FIG. 6, the method 600 includes the following steps. In step 610, the wheel/rail vertical forces applied to the first to fifth unit measurement areas are obtained using the 'shear force+support force' method respectively.

In step 620, the wheel/rail vertical forces applied to the first-second, second-third, third-fourth, and fourth-fifth compound measurement areas are obtained by adding the wheel/rail vertical forces applied to the adjacent unit measurement areas. For example, a wheel/rail vertical force applied to the second-third compound measurement area is obtained by adding the wheel/rail vertical forces applied to the second and third unit measurement areas, and a wheel/rail vertical force applied to the third-fourth compound measurement area is obtained by adding the wheel/rail vertical forces applied to the third and fourth unit measurement areas, and so on.

Since the I-th shear force measurement point is arranged such that when any wheelset is on the I-th shear force measurement transition area, a previous wheelset and a following wheelset of this wheelset are located outside the ((I−1)−I)-th compound measurement area and outside the (I+1)-th and (I−1)-th shear force measurement transition areas. This condition achieves that: 1) step 610 may obtain a continuous wheel/rail vertical force when any wheelset passes the first to fifth unit measurement areas except the first to sixth shear force measurement transition areas; and 2) step 620 may obtain an accurate value of the wheel/rail vertical force when any wheelset passes the second to fifth shear force measurement transition areas, thus overcoming the effect of the common second to fifth shear force measurement transition areas effectively.

In step 630, the wheel/rail vertical forces applied by each wheelset to the first to fifth unit measurement areas and to the first-second, second-third, third-fourth, and fourth-fifth compound measurement areas are combined to obtain a continuous wheel/rail vertical force when each wheelset passes the first, second, third, fourth, and fifth unit measurement areas.

By adding simple constraint conditions and constructing a compound measurement area, the method according to an embodiment of the present invention overcomes the 'quasi-continuous' problem of the existing 'shear force+support force' method during long-distance wheel/rail vertical force measurement, realizing a long-distance fully continuous ground measurement of a wheel/rail vertical force in the 'shear force+support force' mode.

In order to better describe the construction idea of adding simple constraint conditions and a compound measurement area on the basis of the existing 'shear force+support force' method in the present invention, hereinafter, the stress state of the i-th wheel/rail (i.e., wheelset i) when rolling on a certain common shear force $Q_{ck}$ measurement transition area will be analyzed comprehensively.

Figure 7:
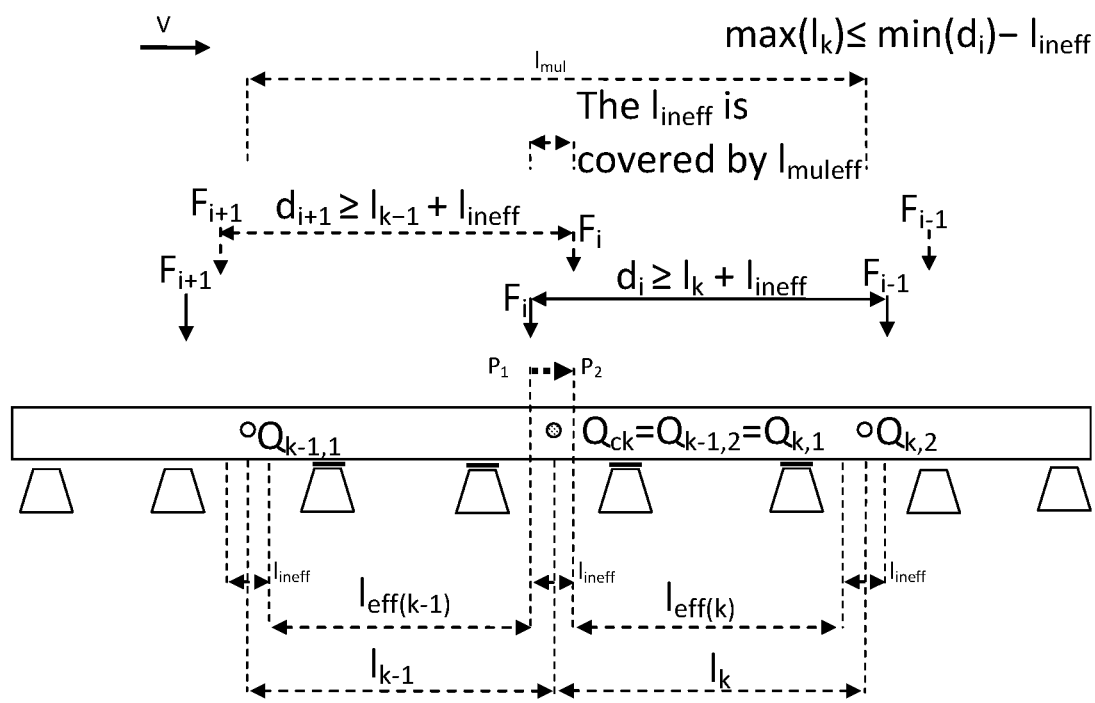
FIG. 7 is a schematic diagram of a continuous measurement method for a wheel/rail vertical force according to an embodiment of the present invention.

FIG. 7 is a schematic diagram of a fully continuous ground continuous measurement method for a wheel/rail vertical force according to an embodiment of the present invention. As shown in FIG. 7, $P_1$ and $P_2$ are positions of wheelset i when rolling into and rolling away from the $Q_{ck}$ measurement transition area; $F_i$, $F_{i-1}$ and $F_{i+1}$ are vertical forces applied by wheelset i and a previous wheelset and a following wheelset thereof to the steel rail; $l_{k-1}$ and $l_{eff(k-1)}$ are a measurement area and an effective measurement area of the (k−1)-th unit wheel/rail vertical force continuous unit measurement area, $l_k$ and $l_{eff(k)}$ are a measurement area and an effective measurement area of the k-th unit wheel/rail vertical force continuous unit measurement area; $Q_{k-1,1}$ and $Q_{k-1,2}$ are two shear force measurement points of the (k−1)-th unit measurement area, $Q_{k,1}$ and $Q_{k,2}$ are two shear force measurement points of the k-th unit measurement area, and the end common shear force measurement point $Q_{ck}=Q_{k-1,2}=Q_{k,1}$; $d_i$ is the spacing between the i-th wheelset and the (i−1)-th wheelset, $d_{i+1}$ is the spacing between the i-th wheelset and the (i+1)-th wheelset; and $l_{mul}$ is a compound measurement area constructed by the (k−1) and k-th unit measurement areas with the common shear force measurement point $Q_{ck}$ removed, and $l_{muleff}$ is an effective area of the compound measurement area $l_{mul}$.

When the wheelset i ($F_i$) is located at position $P_1$, since unit measurement areas k−1 and k satisfy formula (2), i.e., $1 \leq \min(d_i)$, the wheelset i+1($F_{i+1}$) is located outside measurement transition area $Q_{k-1,1}$ (left side), and if it also satisfies $$d_i \geq l_k + l_{ineff} \quad (3),$$

then the wheelset i−1 ($F_{i-1}$) will also be located outside measurement transition area $Q_{k,2}$ (right side), and wheelset i+1 and i−1 will not affect the accurate measurement of $Q_{k-1,1}$ and $Q_{k,2}$, at this moment, a compound measurement area constructed by the (k−1)-th and k-th unit measurement areas with the common shear force measurement point $Q_{ck}$ removed may accurately measure the wheel/rail vertical force $F_i$ of wheelset i.

When the wheelset i ($F_i$) is located at position $P_2$, since unit measurement areas k−1 and k satisfy formula (2), the wheelset i−1 ($F_{i-1}$) is located outside measurement transition area $Q_{k,2}$ (right side), and if it also satisfies $$d_{i+1} \geq l_{k-1} + l_{ineff} \quad (4),$$

then the wheelset i+1 ($F_{i+1}$) will also be located outside measurement transition area $Q_{k-1,1}$ (left side), and wheelset i+1 and i−1 will not affect the accurate measurement of $Q_{k-1,1}$ and $Q_{k,2}$, at this moment, a compound measurement area constructed by the (k−1)-th and k-th unit measurement areas with the common shear force measurement point $Q_{ck}$ removed may accurately measure the wheel/rail vertical force $F_i$ of the wheelset i.

Thus, when the (k−1)-th and k-th unit measurement areas arranged continuously satisfy the condition that the length of the unit measurement area is smaller than the difference between a corresponding wheelset spacing (wheel base) and the length of the shear force transition area, i.e., the condition of formulas (3) and (4), although the wheel/rail vertical force applied to the compound measurement area may be a resultant force of the wheel/rail vertical forces of a plurality of wheelset during different periods of time, the wheel/rail vertical force applied when wheelset i passes the common shear force $Q_{ck}$ measurement transition area may be measured accurately by the constructed compound measurement area. That is, the effective measurement area $l_{muleff}$ of wheelset i by the compound measurement area covers the ineffective measurement area of the existing 'shear force+ support force' method.

The conditions of formulas (3) and (4) are expressed in the embodiment shown in FIG. 5 as that: the second shear force measurement point is arranged such that when any wheelset is located in the measurement transition area of the second shear force measurement point, a previous wheelset and a following wheelset of this wheelset are located outside the first-second compound measurement area and also outside the measurement transition areas of the third shear force measurement point and the first shear force measurement point.

The conditions of formulas (3) and (4) are expressed in the embodiment shown in FIG. 6 as that: the I-th (I equals 2 to 5) shear force measurement point is arranged such that when any wheelset is located in the I-th shear force measurement transition area, a previous wheelset and a following wheelset of this wheelset are located outside the ((I−1)−I)-th compound measurement area and also outside the (I+1)-th and (I−1)-th shear force measurement transition areas.

And so on, if all unit wheel/rail vertical force continuous measurement areas satisfy the condition that the length of the unit measurement area is smaller than the difference between the minimum wheel base and the length of the shear force transition area (formula 5), $$\max(l_k) \leq \min(d_i) - l_{ineff} \quad (5),$$

all adjacent unit measurement areas may be removed with common shear force measurement points and construct a compound measurement area, and a wheel/rail vertical force which is continuous on the entire measurement segment except the front and back end shear force measurement transition areas by combining wheel/rail vertical forces obtained by each compound measurement area when a wheelset passes the measurement transition areas of all common shear force measurement points and a wheel/rail vertical force within the effective measurement range of each unit measurement area, realizing long-distance fully continuous measurement of the wheel/rail vertical force.

According to an embodiment of the present invention, the combination of the wheel/rail vertical forces on the first and second unit measurement areas and the first-second compound measurement area may be performed in a sequential splicing manner.

Figure 8:
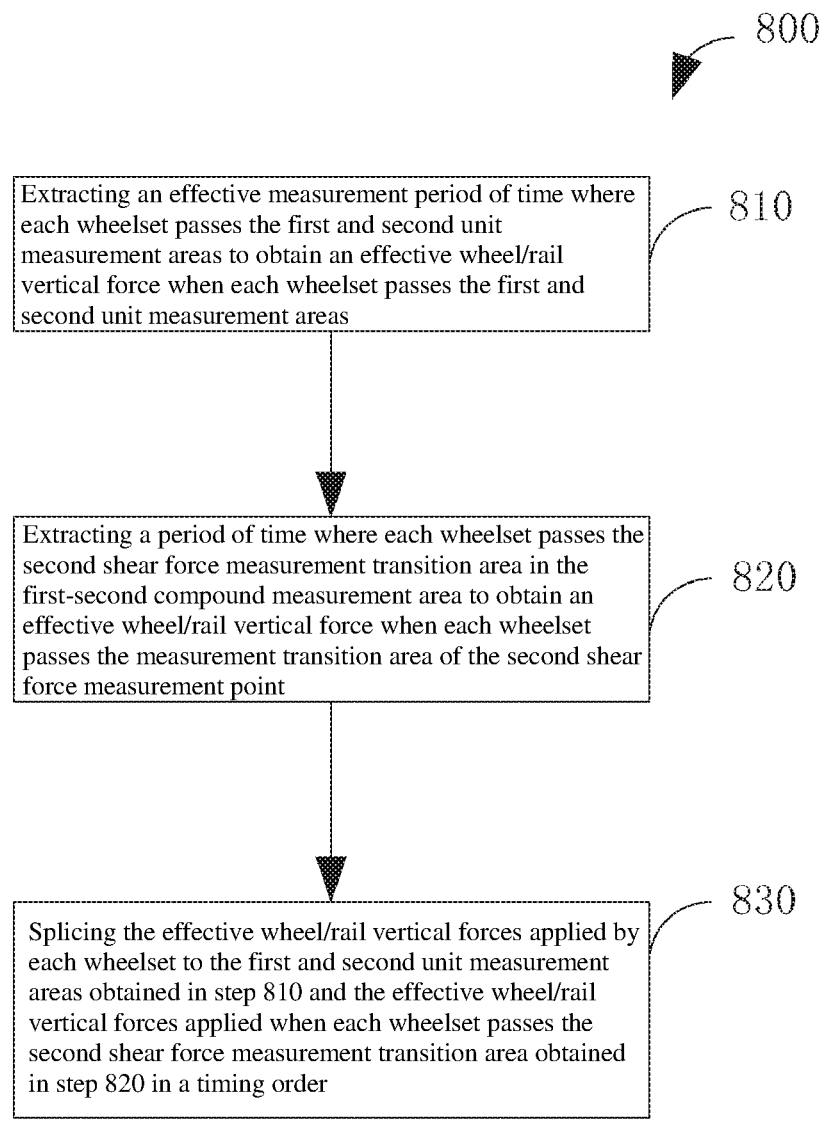
FIG. 8 is a flowchart of a combination method for a wheel/rail vertical force according to an embodiment of the present invention.

FIG. 8 is a flowchart of a combination method for a wheel/rail vertical force according to an embodiment of the present invention. As shown in FIG. 8, the combination method 800 includes the following steps. In step 810, an effective measurement period of time when each wheelset passes the first and second unit measurement areas is extracted to obtain an effective wheel/rail vertical force when each wheelset passes the first and second unit measurement areas. In step 820, a period of time where each wheelset passes the second shear force measurement transition area in the first-second compound measurement area is extracted to obtain an effective wheel/rail vertical force when each wheelset passes the measurement transition area of the second shear force measurement point. In step 830, the effective wheel/rail vertical forces when each wheelset passes the first and second unit measurement areas obtained in step 810 and the effective wheel/rail vertical force when each wheelset passes the second shear force transition area obtained in step 820 are spliced in a time sequence, thus obtaining a continuous wheel/rail vertical force when each wheelset passes the first and second unit measurement areas except the first and third shear force measurement point transition areas.

According to an example of the present invention, the extraction of the effective measurement periods of time of each wheelset on the first and second unit measurement areas may be made reference to the output signal simulation diagram of the mid-span shear force measurement point shown in FIG. 3. In FIG. 3, the first peak (being a negative peak in the figure) time arranged in a time sequence may be used to estimate the moment when a wheelset rolls into the shear force measurement transition area; and the second peak (being a positive peak in the figure) time may be used to estimate the moment when the wheelset rolls away from the shear force measurement transition area. The effective measurement period of time of each wheelset on a certain unit measurement area may start from the moment when the wheelset rolls away from the first shear force measurement transition area of the unit measurement area and end at the moment when the wheelset rolls into the second shear force measurement transition area of the unit measurement area. Considering a long-distance continuous measurement process, taking the second and third unit measurement areas in the embodiment of FIG. 6 as an example: an effective measurement period of time of a wheelset on the second unit measurement area may start from the moment when the wheelset rolls away from the second shear force measurement transition area and end at the moment when the wheelset rolls into the third shear force measurement transition area; and an effective measurement period of time of a wheelset on the third unit measurement area may start from the moment when the wheelset rolls away from the third shear force measurement transition area and end at the moment when the wheelset rolls into the fourth shear force measurement transition area.

According to an example of the present invention, an effective measurement period of time of wheelset i on a certain compound measurement area may start from a latter one (i.e., a larger value) between the moment when wheelset i rolls away from the first shear force measurement transition area of the compound measurement area and the moment when a previous wheelset (i.e., the (i−1)-th wheelset) rolls away from the second shear force measurement transition area of the compound measurement area, and end at a previous one (i.e., a smaller value) between the moment when wheelset i rolls into the second shear force measurement transition area of the compound measurement area and the moment when a following wheelset (i.e., the (i+1)-th wheelset) rolls into the first shear force measurement transition area of the compound measurement area.

For example, an effective measurement period of time of a certain wheelset on the first-second compound measurement area may start from the larger moment between the moment when this wheelset rolls away from the measurement transition area of the first shear force measurement point and the moment when a previous wheelset rolls away from the measurement transition area of the third shear force measurement point, and end at the smaller moment between the moment when this wheelset rolls into the measurement transition area of the third shear force measurement point and the moment when a following wheelset rolls into the measurement transition area of the first shear force measurement point.

A period of time where a certain wheelset passes the second shear force measurement transition area may start from the moment when the wheelset rolls into the second shear force measurement transition area and end at the moment when the wheelset rolls away from the second shear force measurement transition area. When the setting of a unit measurement area satisfies formula (5), an effective measurement period of time of this wheelset on the first-second compound measurement area may include the period of time where the wheelset passes the second shear force measurement transition area.

As such, as mentioned in the combination method 800, the effective wheel/rail vertical force when each wheelset is in the first and second unit measurement areas and the effective wheel/rail vertical force when a corresponding wheelset passes the second shear force transition area obtained from the first-second compound measurement area are directly spliced in a time sequence, thus obtaining a continuous wheel/rail vertical force when each wheelset passes the first and second unit measurement areas except the first and third shear force measurement point transition areas.

Further, according to another example of the present invention, measurement results of wheel/rail vertical forces applied by a wheelset on a unit measurement area and a compound measurement area are combined in a manner of sequential splicing to generate a continuous wheel/rail vertical force, periods of time in which the wheel/rail vertical forces do not overlap being spliced directly, and periods of time in which the wheel/rail vertical forces overlap being selected randomly or averaged and then spliced. Obviously, the combination method 800 is one which is easy to understand and implement in the combination methods of the present invention.

For the sake of simplicity, in the following examples of this embodiment, the direct sequential splicing method is employed. Each wheelset takes all data within the effective measurement period of time of the wheel/rail vertical force applied to each unit measurement area and takes data within the period of time when a corresponding wheelset passes a common shear force measurement transition area on a compound measurement area.

Figure 9:
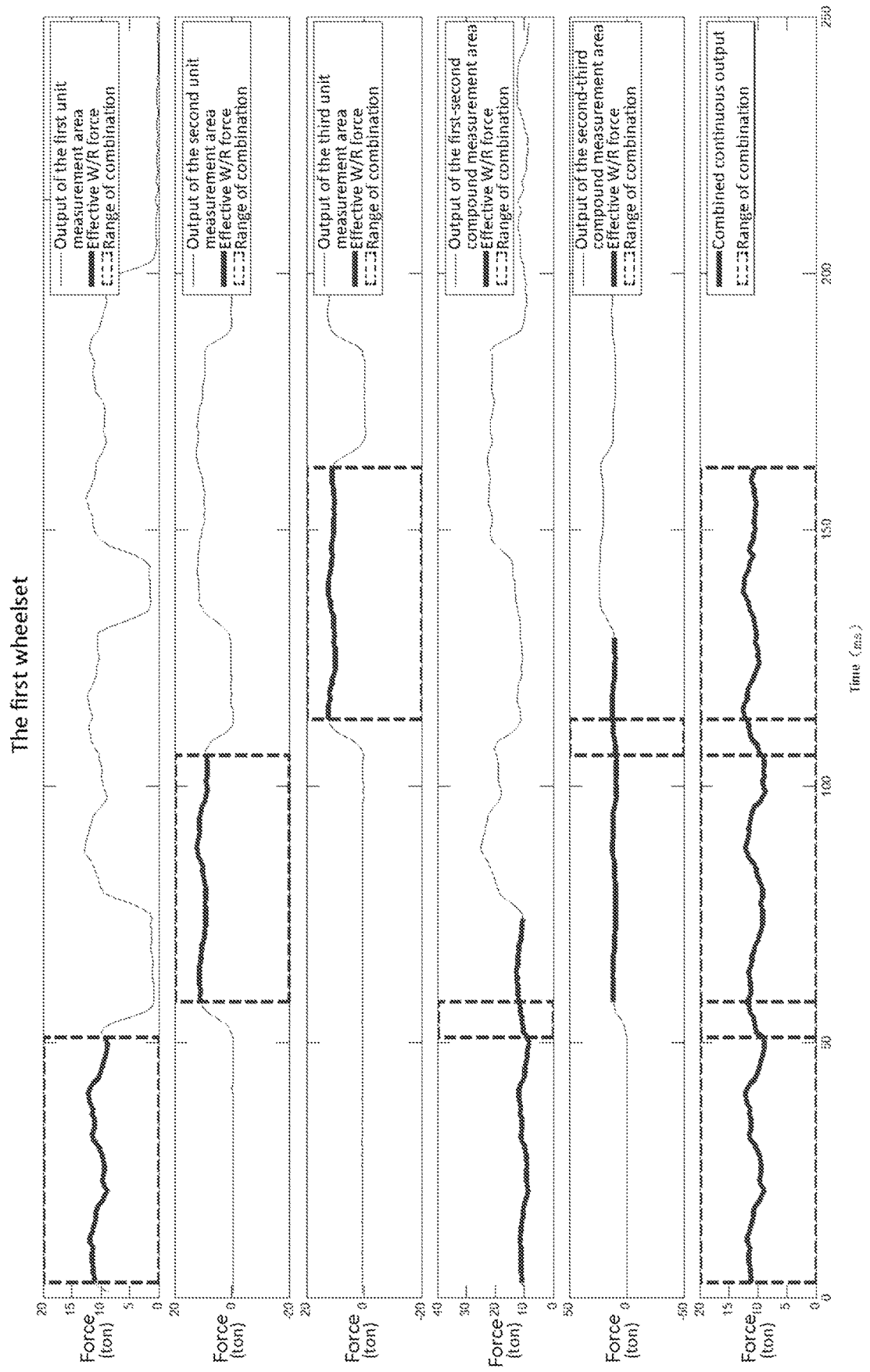
FIGS. 9, 10 and 11 are standard process comprehensive diagrams of obtaining a long-distance continuous vertical force by processing data of three continuous wheel/rail vertical force unit measurement areas and the compound measurement areas when first three wheelsets of a six-axle locomotive pass a TPDS according to the method in the present invention.
Figure 10:
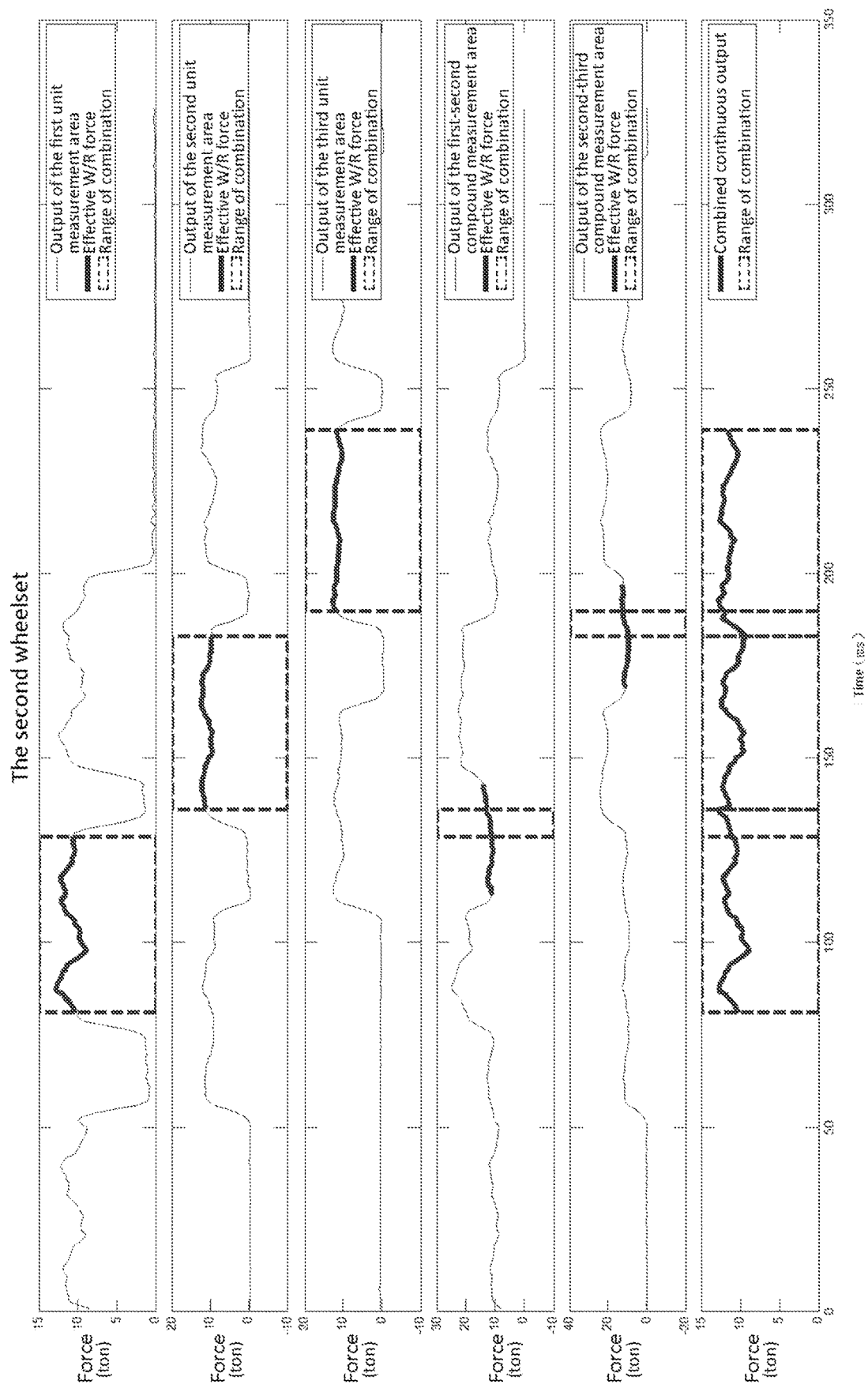
Figure 11:
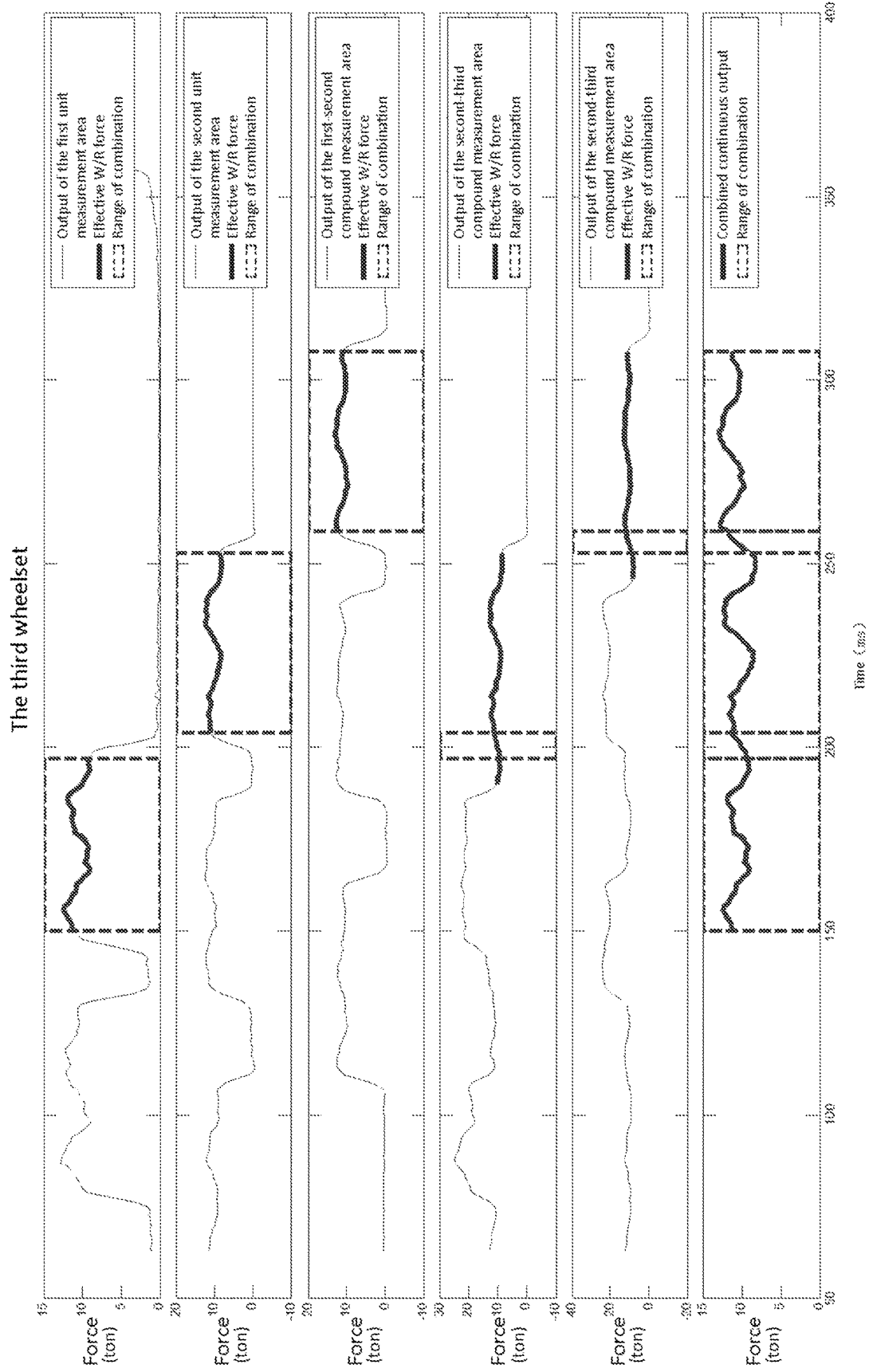

FIGS. 9, 10 and 11 are standard process comprehensive diagrams of obtaining a long-distance continuous vertical force by processing data when first three wheelsets of a locomotive satisfying the implementation condition of the present invention (formula (5)) pass three unit measurement areas of a TPDS which are arranged in order according to the method in the present invention The six windows in the standard process comprehensive diagram are respectively from the top downwards: a wheel/rail vertical force output from a first unit measurement area, a wheel/rail vertical force output from a second unit measurement area, a wheel/rail vertical force output from a third unit measurement area, a wheel/rail vertical force output from a first-second compound measurement area, a wheel/rail vertical force output from a second-third compound measurement area and a final long-distance continuous vertical force output window. The thick solid lines in the first five windows represent the effective measurement ranges of a certain wheel/rail on a corresponding unit measurement area or compound measurement area. In this embodiment, the long-distance continuous wheel/rail vertical force is formed by a direct splicing of the wheel/rail vertical forces in the above five unit measurement areas and compound measurement areas. The thick dashed frames in the first five windows represent the splicing ranges of the wheel/rail vertical force measurement data of each measurement area. In this embodiment, all effective data is selected for each unit measurement area, and effective data when a wheelset passes a common shear force measurement transition area in the middle of the compound measurement area is applied to the compound measurement area. The long-distance continuous vertical force in the sixth window is formed by the splicing of the data in five dashed frames in a time sequence.

When comparing the outputs of the compound measurement areas in FIGS. 9, 10 and 11, it can be seen that the effective measurement range of the compound measurement area in FIG. 9 is closer to the front than and longer than the common shear force measurement transition area, the effective measurement range of the compound measurement area in FIG. 10 is closer to the center than and shorter than the common shear force measurement transition area, and the effective measurement range of the compound measurement area in FIG. 11 is closer to the back than and longer than the common shear force measurement transition area. Although for wheelsets at different positions, since the front and back wheel bases are different, the length and position of the effective measurement range (indicated by thick solid lines) of the compound measurement area are different; however, since a locomotive satisfies the implementation conditions of the present invention, the effective measurement range of the compound measurement area shall contain a shear force measurement transition area common to corresponding unit measurement areas, thus overcoming the problem of the existing 'shear force+support force' method that the shear force measurement transition area cannot be measured accurately, effectively realizing the long-distance fully continuous ground measurement of the wheel/rail vertical force.

It can also be seen in this embodiment that the implementation of the measurement method in the present invention is flexible and compatible with the existing devices in which rail interaction is monitored. The measurement device in the present invention can be directly disposed to realize a fully continuous measurement of the wheel/rail vertical force applied to a vehicle, and software algorithm upgrading may be performed to an original device according to the method in the present invention to satisfy the requirement of performing a fully continuous measurement to a vehicle separately in the present invention, which has a good operation basis and broad prospect.

It can be seen in the implementation steps of the present invention that the implementation order of the steps may be adjusted or combined according to the measurement principle proposed in this patent.

Figure 12:
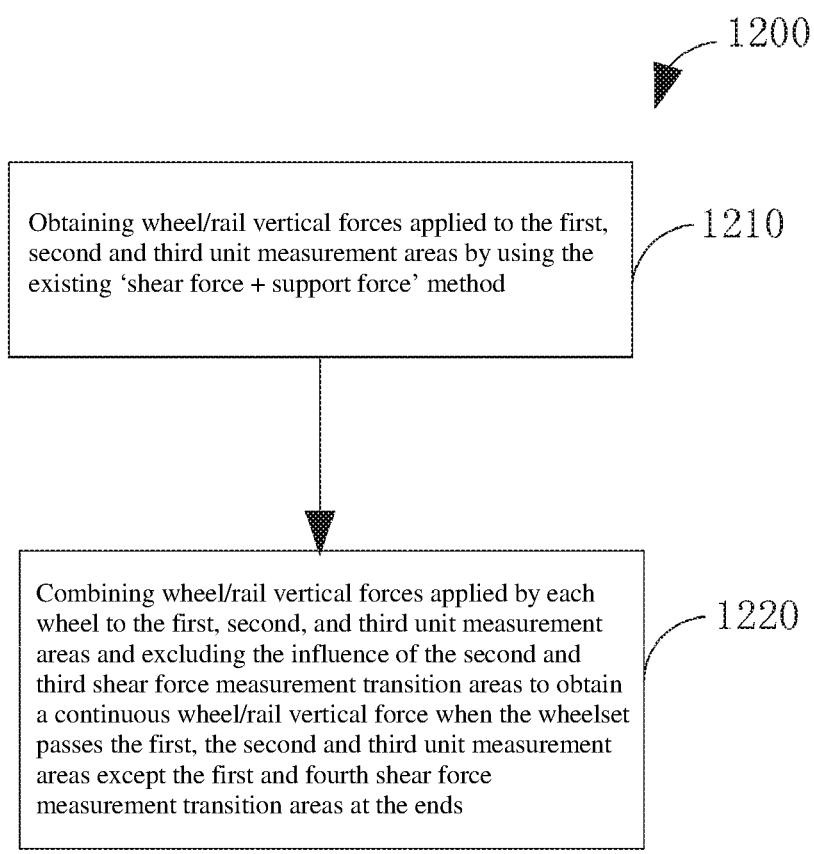
FIG. 12 is a flowchart of a measurement method for a wheel/rail vertical force according to another embodiment of the present invention.

FIG. 12 is a flowchart of a fully continuous ground measurement method for a wheel/rail vertical force according to another embodiment of the present invention, including three unit measurement areas arranged in order: the first to third unit measurement areas respectively including first and second shear force measurement points, second and third shear force measurement points, third and fourth shear force measurement points and sleeper support force measurement points underneath. The setting of the unit measurement areas satisfies the requirement of formula (5). As shown in FIG. 12, the measurement method 1200 in this embodiment includes the following steps. In step 1210, obtaining wheel/rail vertical forces applied to the first to third unit measurement areas using the existing 'shear force+support force' method.

In step 1220, wheel/rail vertical forces applied by a wheelset to the first to third unit measurement areas excluding the influence of the second and third shear force measurement transition areas are combined to obtain a continuous wheel/rail vertical force when the wheelset passes the first to third unit measurement areas except the first and fourth shear force measurement transition areas at the ends.

According to the embodiments of the present application as shown in FIGS. 6 and 8, the influence of the second and third shear force measurement transition areas may be excluded by establishing a first-second and second-third compound measurement areas.

According to an embodiment of the present invention, the exclusion of the effect of the second and third shear force measurement transition areas may also be performed in the following manner.

In this embodiment, a data range (referring to the range indicated by thick virtual frames in FIG. 13) for combination of a certain wheelset in each unit measurement area is defined as follows: 1) for all middle unit measurement areas, a data range for combination starts from the moment when the wheelset rolls into the first shear force measurement transition area of this unit measurement area and ends at the moment when the wheelset rolls away from the second shear force measurement transition area of this unit measurement area, and for the second unit measurement area, a data range for combination starts from the moment when the wheelset rolls into the first shear force measurement transition area (i.e., the second shear force measurement transition area) of the second unit measurement area and ends at the moment when the wheelset rolls away from the second shear force measurement transition area (i.e., the third shear force measurement transition area) of the second unit measurement area; 2) for the first unit measurement area, a data range for combination starts from the moment when the wheelset rolls away from the first shear force measurement transition area and ends at the moment when the wheelset rolls into the second shear force measurement transition area; 3) for the last unit measurement area, a data range for combination starts from the moment when the wheelset rolls into the first shear force measurement transition area of this unit measurement area and ends at the moment when the wheelset rolls into the second shear force measurement transition area of this unit measurement area. For example, a data range for combination of the last unit measurement area in this embodiment (i.e., the third unit measurement area) starts from the moment when the wheelset rolls into the 1st shear force measurement transition area of this unit measurement area (i.e., the third shear force measurement transition area) and ends at the moment when the wheelset rolls into the 2nd shear force measurement transition area (i.e., the fourth shear force measurement transition area) of this unit measurement area.

According to an example of the present invention, zero prolongation is performed on data outside the range for combination of a certain wheelset in the first to third unit measurement areas, i.e., all data outside the range for combination is assigned zero, and merely data within the ranges for combination of the first to third unit measurement areas are adopted. Next, the data within the ranges for combination of the first to third unit measurement areas are added to obtain a continuous wheel/rail vertical force when the wheelset passes the first to third unit measurement areas except the first and fourth shear force measurement transition areas at the ends (referring to the overlap and combination continuous output curve in the fourth window in FIG. 13).

Although the process in this embodiment seems different from those in FIGS. 6 and 8, the principles and results thereof are the same. For example, a non-overlapping portion in the range for combination of the first and second unit measurement areas includes the effective measurement ranges of the first and second measurement areas, and an overlapping portion corresponds to the second shear force measurement transition area. The wheel/rail vertical force output of the first unit measurement area satisfies formula $O_1=Q_{1,1}+Q_{1,2}+\Sigma_{j=1}^{n} N_{1,j}$, and the wheel/rail vertical force output of the second unit measurement area satisfies formula $O_2=Q_{2,1}+Q_{2,2}+\Sigma_{j=1}^{n} N_{2,j}$, and an addictive result thereof is as follows:

$$O_1+O_2=Q_{1,1}+Q_{1,2}+Q_{2,1}+Q_{2,2}+\Sigma_{j=1}^{n}N_{1,j}+\Sigma_{j=1}^{n}N_{2,j}$$

Since a shear force applied by the right rail to the left rail and a shear force applied by the left rail to the right rail are an acting force and a counter force, with the same magnitude and opposite directions, i.e., $Q_{1,2}+Q_{2,1}=0$, a result of formula (6) is obtained finally:

$$O_1+O_2=Q_{1,1}+Q_{2,2}+\Sigma_{j=1}^{n}N_{1,j}+\Sigma_{j=1}^{n}N_{2,j} \quad (6)$$

Formula (6) refers to a wheel/rail vertical force applied to the compound measurement area taking the first shear force measurement point ($Q_{1,1}$, the first shear force measurement point) of the first unit measurement area and the second shear force measurement point ($Q_{2,2}$, the third shear force measurement point) of the second unit measurement area as a starting point and an ending point.

As such, when a certain wheelset is located in the second shear force measurement transition area, since the second shear force measurement point is in a non-pure shear force state, the output $Q_{1,2}$ or $Q_{2,1}$ thereof cannot accurately reflect the mutual shear force between the left rail and the right rail at the shear force measurement point, causing $O_1$ and $O_2$ being unequal to the wheel/rail vertical force of the wheelset. However, if at this time, a previous wheelset of this wheelset is located outside the second unit measurement area and the third shear force measurement transition area and a following wheelset is located outside the first unit measurement area and the first shear force measurement transition area, there is merely one wheel in the first and second unit measurement areas and the output ($Q_{1,1}$) of the first shear force measurement point and the output ($Q_{2,2}$) of the third shear force measurement point are accurate, and the sum of $O_1$ and $O_2$ represented by formula (6) equals to the wheel/rail vertical force of the wheelset at this time. This embodiment is essentially the same as those shown in FIGS. 6 and 8, but is more concise in terms of process.

Those skilled in the art shall understand that under the premise of satisfying the principles of the present invention, it is possible to obtain a simplified implementation method consistent with the standard implementation process of the present invention by adjusting and combining the steps in the standard implementation process of the present invention. Under the premise of satisfying the principles of the present invention, parameters (such as the range of combination data) in the particular implementation process may also be varied locally to obtain other similar implementation processes.

Figure 13:
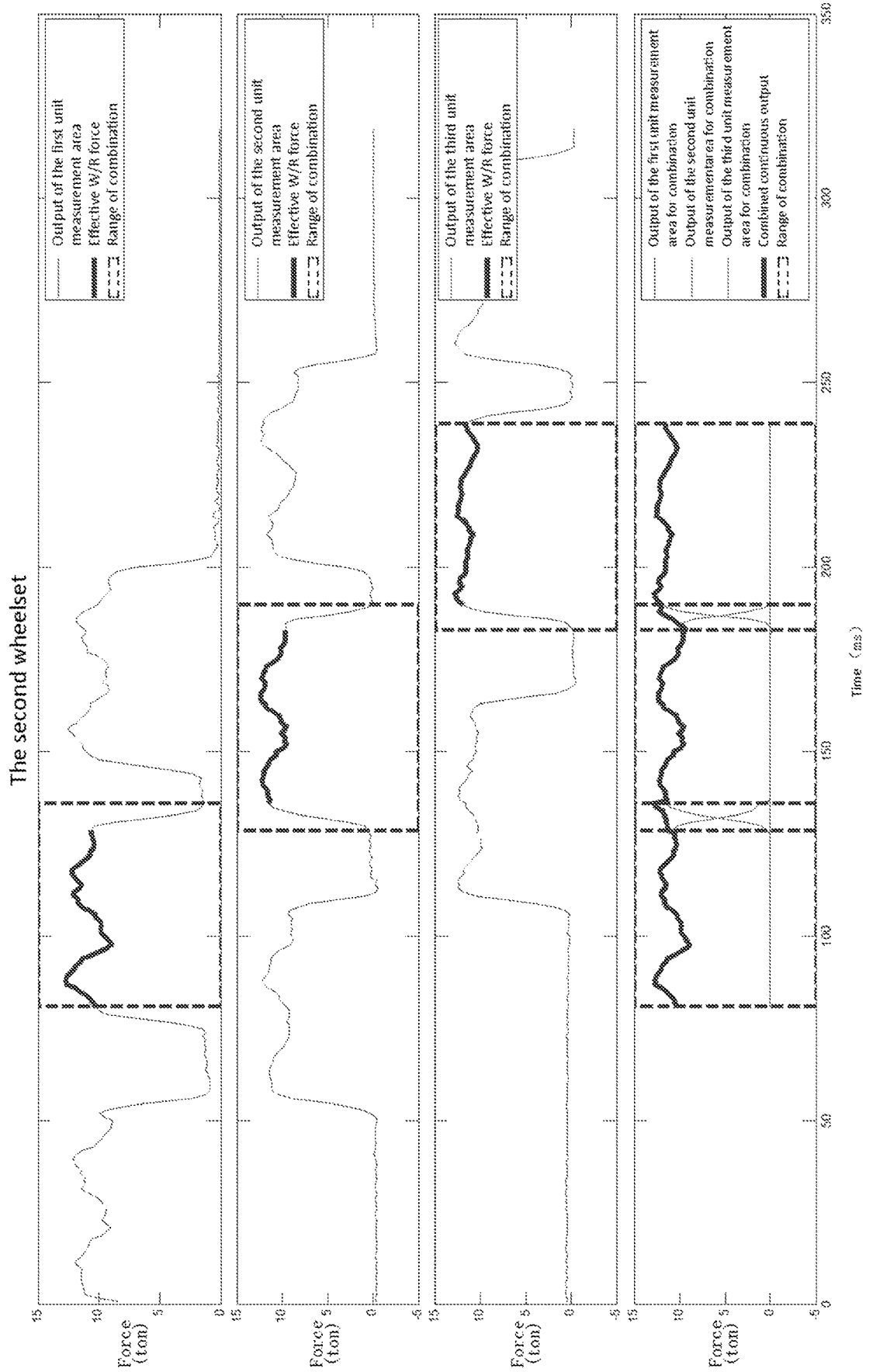
FIG. 13 is a simplified process comprehensive diagram of obtaining a long-distance continuous vertical force by processing data when a second wheelset of a certain six-axle locomotive passes a TPDS according to another embodiment of the present invention.

FIG. 13 is a simplified process comprehensive diagram of obtaining a long-distance continuous vertical force by processing data when a second wheelset of a certain six-axle locomotive passes a TPDS according to another embodiment of the present invention. The four windows in the simplified process comprehensive diagram are respectively from up to down a wheel/rail vertical output on a first unit measurement area, a wheel/rail vertical force output on a second unit measurement area, a wheel/rail vertical force output on a third unit measurement area and a final long-distance continuous vertical force output window.

Similar to FIGS. 9, 10 and 11, the thick solid lines in the first three windows in FIG. 13 represent the effective measurement ranges of a certain wheel/rail on corresponding unit measurement areas. The long-distance continuous wheel/rail vertical force in this embodiment is formed by a direct combination of the above three outputs. The thick virtual frames in the first three windows represent the ranges of the first three output data for combination. It can be seen that being different from FIGS. 9, 10 and 11, the range of the output data for combination in this embodiment is greater than the effective measurement range on the unit measurement area, including the range of a corresponding common shear force measurement transition area.

The fourth window in FIG. 13 illustrates a data combination process in this embodiment. The time minimum and time maximum of data to be combined (data in the dashed frame) in the first three windows form an upper and lower limit of a combined time interval. The data to be combined in the first three windows is prolonged in a combination time interval, and the prolongation method is to assign zero to output data beyond the virtual frame time. Three groups of prolonged data are added in a time sequence to obtain a long-distance fully continuous wheel/rail vertical force, as shown by the thick solid lines in the fourth window in FIG. 13.

It can be seen from FIG. 13 that there is an overlapping portion in the data ranges for combination of two adjacent unit measurement areas which corresponds to a time interval when the wheelset passes the common shear force measurement transition area. Compared to FIG. 10, it can be seen that in this embodiment, the 'addictive operation' result of the time overlapping portions in the combination data of two adjacent unit measurement area equals to outputs of a corresponding compound areas in FIG. 10. Moreover, due to zero prolongation, the 'addictive operation' of the effective measurement range on the unit measurement area in this embodiment also equals to an output in the effective measurement range on the unit measurement area in FIG. 10. Finally, the fourth window in simplified process comprehensive diagram 13 is completely consistent with the result of the sixth window in standard process comprehensive diagram 10, which verifies the consistency and reliability of these two methods.

Figure 14:
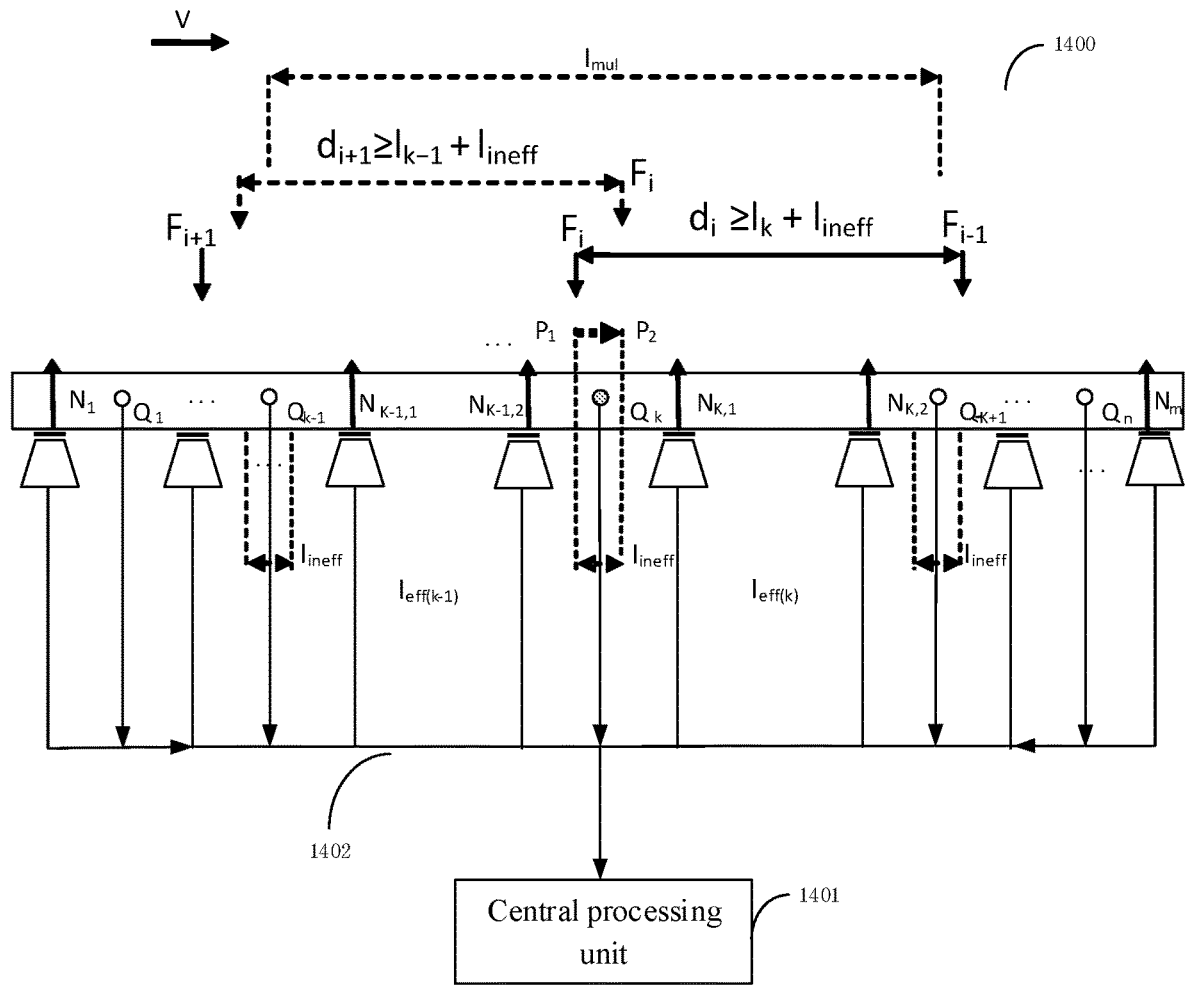
FIG. 14 is a schematic diagram of a measurement system for a wheel/rail vertical force according to an embodiment of the present invention.

FIG. 14 is a schematic diagram of a measurement system for a wheel/rail vertical force according to an embodiment of the present invention. As shown in FIG. 14, the system 1400 includes a plurality of rail mid-span shear force measurement devices $Q_1$-$Q_n$ arranged at intervals, support force measurement devices $N_1$-$N_m$ arranged on all sleepers underneath rails corresponding to the shear force measurement devices, a central control unit 1401 and a cable 1402. The plurality of rail mid-span shear force measurement devices $Q_1$-$Q_n$ and the support force measurement devices $N_1$-$N_m$ are connected to the central control unit 1401 via the cable 1402. The distance $Q_k$ to $Q_{k+1}$ between any two continuous shear force measurement devices is smaller than the difference between the minimum wheel base $d_{min}$ between wheelsets to be measured and the length $l_{eff}$ of the shear force transition area. In other words, at any moment, when a certain wheelset is located in a shear force measurement area between two unit measurement areas, a previous wheelset and a following wheelset of this wheelset are both located outside these two unit measurement areas and the shear force transition areas at the ends thereof. The central processing unit 1401 obtains a continuous wheel/rail vertical force according to the method proposed in the present application. According to an example of the present invention, the wired cable may also be replaced with a wireless cable. Either wired communications or wireless communications can be applied to the present invention.

The measurement method in the present invention expands a quasi-continuous measurement of a wheel/rail vertical force with an m order length widely applied in the existing engineering to any required length, realizing long-distance fully continuous ground measurement of the wheel/rail vertical force and providing conditions for deepening and expansion of wheel/rail interaction research.

Furthermore, the measurement methods in the present invention realize long-distance fully continuous measurement of the wheel/rail vertical force, which can provide an effective means to the dynamics performance experiment and research as well as safety estimation and monitoring of rail vehicles especially high-speed passenger trains and have strong engineering application value.

Furthermore, the implementation of the measurement method in the present invention is flexible and compatible with the existing wheel/rail interaction monitoring device. The original device can be modified according to the requirements of the method in the present invention. Continuous measurement may be performed separately to a vehicle satisfying the requirements of the present invention.

Furthermore, the measurement method in the present invention may also be applied to high-speed continuous rail overload and unbalanced-load detection instrument, weight in-motion or the like.

The above embodiments are merely for the sake of describing the present invention rather than acting as a limitation thereof. Those skilled in the art may also make various changes and modifications without departing from the scope of the present invention, and thus all equivalent technical solutions shall also belong to the scope of the present invention.

The invention claimed is:

1. A continuous measurement method for a single wheel wheel/rail vertical force, in a first unit measurement area, a second unit measurement area and a first-second compound measurement area formed by the first and second unit measurement areas, wherein the first unit measurement area is adjacent to and does not overlap the second unit measurement area, wherein the first unit measurement area including a first shear force measurement point, a second shear force measurement point common to the first and second unit measurement areas and one or more sleeper vertical support force measurement points between the first and second shear force measurement points, and wherein the second unit measurement area further including a third shear force measurement point and one or more sleeper vertical support force measurement points between the second and third shear force measurement points, and the method comprising:

using measurement results of the first and second shear force measurement points and of the sleeper vertical support force measurement points between the first and second shear force measurement points to obtain a wheel/rail vertical force applied to the first unit measurement area;

using measurement results of the second and third shear force measurement points and of the sleeper vertical support force measurement points between the second and third shear force measurement points to obtain a wheel/rail vertical force applied to the second unit measurement area;

obtaining a wheel/rail vertical force applied to the first-second compound measurement area, without using the second shear force measurement point; and combining wheel/rail vertical forces applied by a wheelset to the first unit measurement area and the second unit measurement area and to the first-second compound measurement area to obtain a continuous wheel/rail vertical force of the wheelset.

2. The method according to claim 1, wherein the wheel/rail vertical force applied to the first-second compound measurement area is obtained by using measurement results of the first and third shear force measurement points and of sleeper vertical support force measurement points between the first and third shear force measurement points or by adding the wheel/rail vertical forces applied to the first and second unit measurement areas.

3. The method according to claim 1, wherein when the wheelset is on a second shear force measurement transition area corresponding to the second shear force measurement point, a previous wheelset and a following wheelset of the wheelset are located outside the first-second compound measurement area and also outside a third shear force measurement transition area corresponding to the third shear force measurement point and a first shear force measurement transition area corresponding to the first shear force measurement point.

4. The method according to claim 1, wherein a wheel/rail vertical force applied by the wheelset to the first unit measurement area corresponds to a wheel/rail vertical force applied to the first unit measurement area during a period of time which starts at the moment when the wheelset rolls away from a first shear force measurement transition area and ends at the moment when the wheelset rolls into a second shear force measurement transition area;

a wheel/rail vertical force applied by the wheelset to the second unit measurement area corresponds to a wheel/rail vertical force applied to the second unit measurement area during a period of time which starts at the moment when the wheelset rolls away from the second shear force measurement transition area and ends at the moment when the wheelset rolls into a third shear force measurement transition area; and a wheel/rail vertical force applied by the wheelset to the first-second compound measurement area corresponds to a wheel/rail vertical force applied to the first-second compound measurement area during a period of time between a start moment and an end moment, wherein the start moment is a later moment of a moment when the wheelset rolls away from the first shear force measurement transition area and a moment when a previous wheelset rolls away from the third shear force measurement transition area, and the end moment is an earlier moment of a moment when the wheelset rolls into the third shear force measurement transition area and a moment when a following wheelset rolls into the first shear force measurement transition area.

5. The method according to claim 1, wherein the wheel/rail vertical forces applied by the wheelset both to the first and second unit measurement areas and to the first-second compound measurement area are combined in a manner of sequential splicing to generate the continuous wheel/rail vertical force, wherein periods of time in which the wheel/rail vertical forces do not overlap being spliced directly, and periods of time in which the wheel/rail vertical forces overlap being selected randomly or averaged and then spliced.

6. The method according to claim 1, wherein the shear force measurement points are on a mid-span of a steel rail, and the moments when the wheelset rolls into and away from shear force measurement transition areas are estimated according to positive and negative peak time of a corresponding shear force signal.

7. A fully continuous ground measurement system for a wheel/rail vertical force, comprising:

a plurality of shear force measurement devices and support force measurement devices arranged on a steel rail spaced at intervals, wherein two adjacent shear force measurement devices and the support force measurement devices underneath form a unit measurement area; and a central control unit configured to connect to the shear force measurement devices and the support force measurement devices in a wired or wireless manner, wherein the central control unit, according to the method of any of claims 1-6, obtains a continuous wheel/rail vertical force when a wheelset passes the fully continuous ground measurement system for a wheel/rail vertical force.

8. The system according to claim 7, wherein the support force measurement device is arranged on each sleeper below the steel rail of the unit measurement area.

9. The system according to claim 7, wherein an arrangement of a plurality of mid-span shear force measurement devices satisfies the following condition: the distance between any two adjacent shear force measurement devices is smaller than the difference between a minimum wheel base of a wheelset to be measured and the length of a shear force measurement transition area.

10. The system according to claim 7, wherein the length of a shear force measurement transition area is estimated according to a rail height.

* * * * *